Oct. 14, 1924. 1,511,306
T. B. SLATE
METHOD OF AND APPARATUS FOR REFRIGERATION AND
PRESERVING PERISHABLE PRODUCTS
Filed Jan. 10, 1924 5 Sheets-Sheet 1
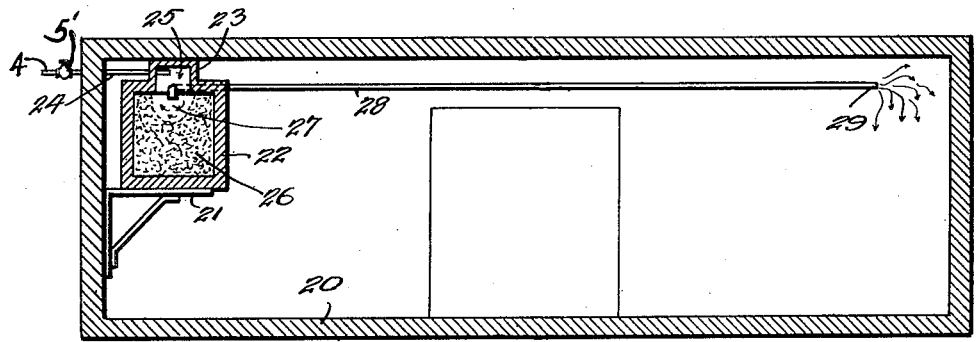
Fig. 1.
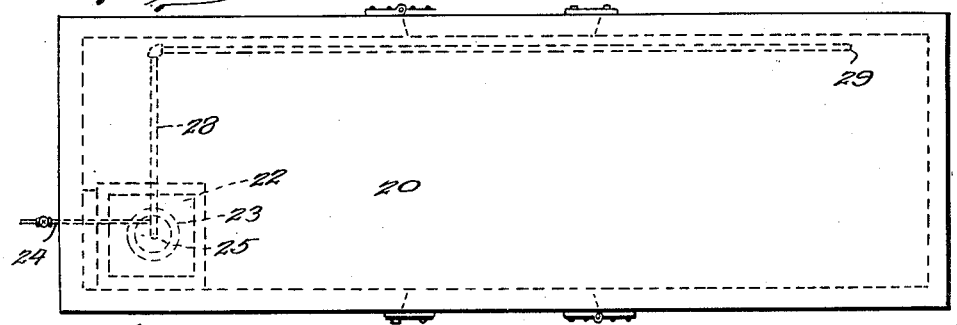
Fig. 2.
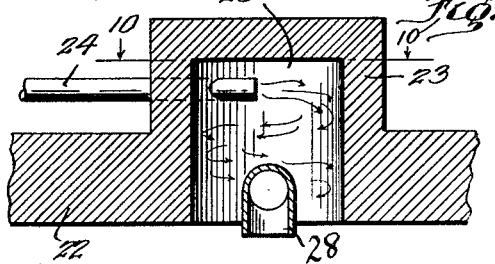
Fig. 3.
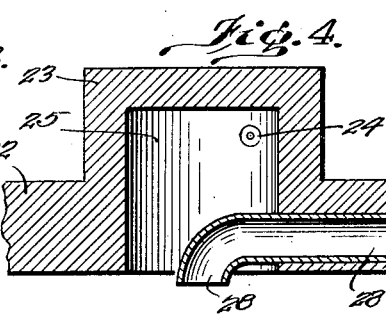
Fig. 4.
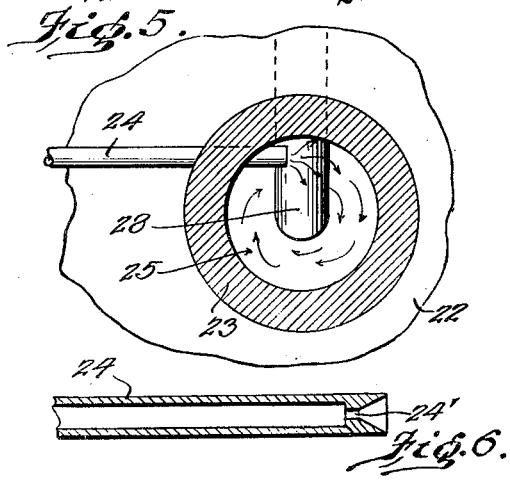
Fig. 5.
Fig. 6.
INVENTOR.
Thomas B. Slate
BY
ATTORNEYS.

Oct. 14, 1924. 1,511,306
T. B. SLATE
METHOD OF AND APPARATUS FOR REFRIGERATION AND
PRESERVING PERISHABLE PRODUCTS
Filed Jan. 10, 1924    5 Sheets-Sheet 2
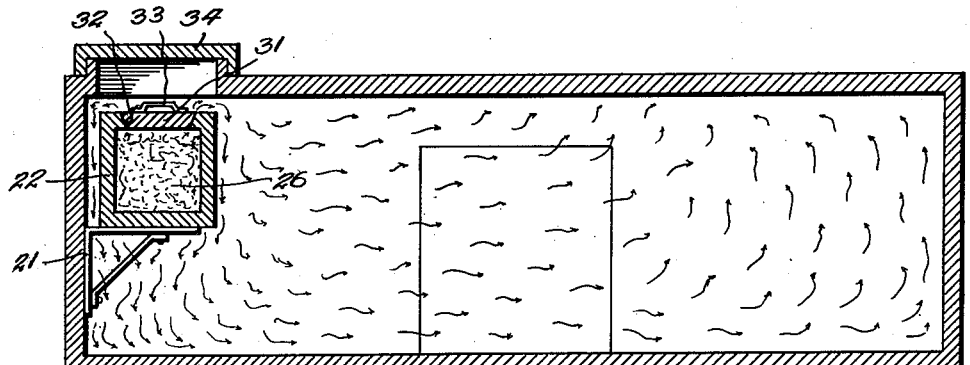
*Fig. 7.*
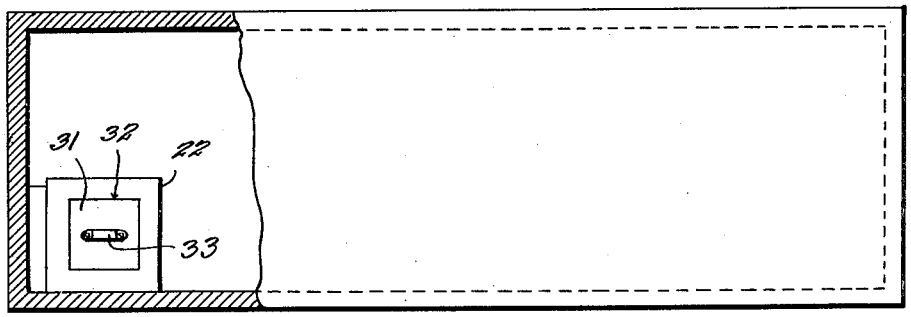
*Fig. 8.*
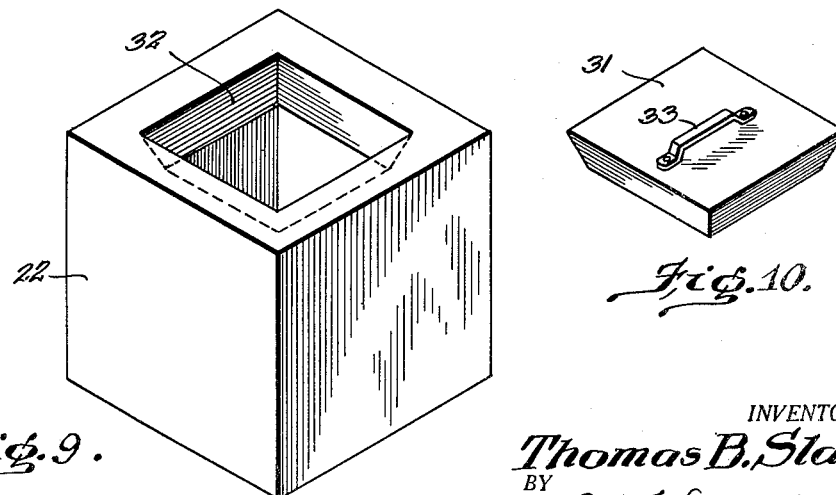
*Fig. 9.*
*Fig. 10.*
INVENTOR.
Thomas B. Slate
BY
Lester L. Sargent
ATTORNEY.

Oct. 14, 1924.                                                                 1,511,306
                              T. B. SLATE
           METHOD OF AND APPARATUS FOR REFRIGERATION AND
                  PRESERVING PERISHABLE PRODUCTS
                      Filed Jan. 10, 1924        5 Sheets-Sheet 4

INVENTOR.
Thomas B. Slate
BY
Lester L. Sargent
ATTORNEYS.

Oct. 14, 1924.  1,511,306
T. B. SLATE
METHOD OF AND APPARATUS FOR REFRIGERATION AND
PRESERVING PERISHABLE PRODUCTS
Filed Jan. 10, 1924    5 Sheets-Sheet 5

INVENTOR.
Thomas B. Slate
BY
ATTORNEYS.

Patented Oct. 14, 1924.

1,511,306

UNITED STATES PATENT OFFICE.

THOMAS B. SLATE, OF NEW YORK, N. Y.

METHOD OF AND APPARATUS FOR REFRIGERATION AND PRESERVING PERISHABLE PRODUCTS.

Application filed January 10, 1924. Serial No. 685,482.

*To all whom it may concern:*

Be it known that I, THOMAS B. SLATE, a citizen of the United States, residing at New York city, in the county of New York and State of New York, have invented a new and useful Method of and Apparatus for Refrigeration and Preserving Perishable Products, of which the following is a specification.

The object of my invention is to provide a novel method of preserving perishable products by a combination of refrigeration and permeation by carbon dioxide or other suitable inert gas the preserving qualities of carbon dioxide gas being especially valuable. My invention also includes the method of handling the gas for this and other purposes such as the preserving, handling and shipping bacterial products for medicinal purposes, or the handling and shipping of any product requiring refrigeration or preservation by the exclusion of air where air is displaced by carbon dioxide or other suitable gas. It is further an object of my invention to make use of carbon dioxide because of its preserving qualities, and because of the ability of the manufacturer to purify the gas; and to provide a system of handling the gas which also improves the purity of the delivered article for use. It is also an object of my invention to provide a method of and apparatus for refrigerating purposes which prevents mold as well as excluding the air with all its destructive bacterial elements, for carbon dioxide gas absorbs moisture and prevents mold. It is also an object of my invention to provide novel and highly efficient non-complicated apparatus by means of which my refrigerating process may be performed, as shown in the accompanying drawings illustrative of a method of manufacturing and handling the refrigerant and the method of using it. I attain these and other objects of my invention by the mechanism illustrated in preferred form, and as applied to the utilization of carbon dioxide in the drawings, in which—

Fig. 1 is a longitudinal sectional view of a chamber such as a refrigerator car with my refrigerator storing apparatus installed;

Fig. 2 is a top plan of same;

Fig. 3 is an enlarged detail sectional view of member 25;

Fig. 4 is a similar view taken at right angles to Fig. 3;

Fig. 5 is a horizontal section on line 10—10 of Fig. 2;

Fig. 6 is a detail sectional view of member 24 showing the approximate shape required for discharge passage 24'.

Fig. 7 is a view of a refrigerating chamber such as a refrigerator car 20, provided with a removable cover or skylight 34;

Fig. 8 is a top plan of same, partly in horizontal section;

Fig. 9 is a perspective view of the snow chamber 22;

Fig. 10 is a perspective view of a suitable cover for same;

Like characters of reference indicate like parts throughout the several views.

Figure 11:
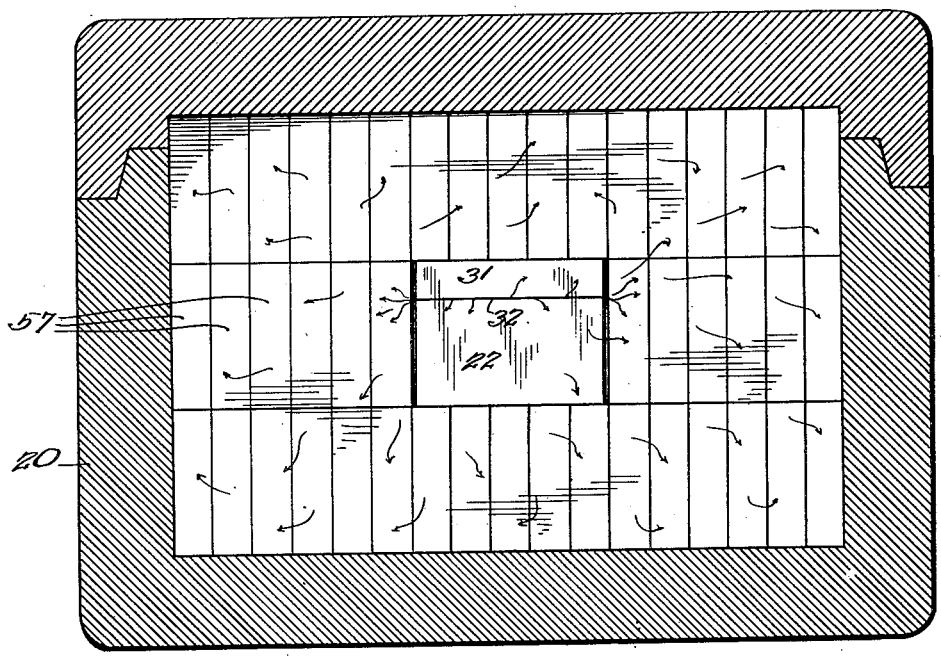
Fig. 11 is a vertical section through a shipping case containing food products and a dioxide snow chamber or refrigerator in the center thereof.

Referring to Figs. 1 to 6, I provide a snow chamber 22 for any chamber 20 to be refrigerated, such as a refrigerator car. As explained in connection with Fig. 15, these chambers 20 and 22 may be formed of or insulated by balsa wood or similar material. Snow chamber 22 is supported on a suitable bracket 21 and is provided with a circular dome or converting chamber 23 into which the nozzle 24 opens, said nozzle 24 being connected to pipe 4 and controlled by valve 5'. As shown in Fig. 2, this nozzle 24 opens into dome 25 at one side thereof to cause a whirling movement of the gas and snow discharging from nozzle 24. I also provide a gas discharging pipe 28 having one open end in communication with the interior of snow box 22 and having the other open end extending to and opening into a distant part of chamber 20, as shown in Figs. 1 and 2.

As shown in Figs. 1 and 2, the gas discharged through pipe 28 into chamber 20 is used for displacing the air, chilling and removing moisture from the chamber and its contents. Referring to Fig. 1, the element 26 represents the carbon dioxide snow formed by the liquid carbon dioxide passing through nozzle 24; and its expansion from high pressure to a gas at atmospheric pressure refrigerates one portion (approximately one-third) of its weight to carbon dioxide snow, the other portion going to gas. The snow being heavier than the gas settles to the outside and bottom of the container by centrifugal force and gravity. The gas being lighter than the snow, collects in the higher and central portion and is forced to the position shown in the drawings by the whirling movement of the inflowing gas and escapes through discharge pipe 28. This action effects a conical pocket 27 that will build up toward pipe 28 until the chamber 22 is completely filled. My apparatus forms the snow in a compact cylindrical body or brick that may be commercially used for many purposes not specifically mentioned herein.

Referring to Fig. 6 which is an enlarged view of nozzle 24, I provide a reduced passage 24' approximately of the shape shown, where expansion starts and where the snow is formed.

Referring to Figs. 7 and 8, I provide a modification of the device shown in Figs. 1 and 2, permitting of the snow being manufactured elsewhere and delivered to the chamber to be refrigerated. I provide a suitable removable cover 34 on chamber 20, and a removable cover 31 on snow chamber 22, so that the snow space 26 is readily accessible for filling when needed. As the snow 26 absorbs in latent form, the heat conducted to it through the walls of the container, it reverts to a gaseous state, the gas may escape from under the lid 31 of chamber 22, or it may be piped in a suitable manner, as shown in Figs. 1 and 2, to any desired part of chamber 20. Fig. 9 shows an enlarged view of chamber 22, and Fig. 10 an enlarged view of cover 31, with a suitable handle 33. As explained in connection with Fig. 15, these chambers 20 and 22 may be formed of or insulated by balsa wood or similar material.

Referring to Fig. 11, I provide a simple means of using the refrigerator box 22 in small shipping containers 20, for the shipment of small quantities of perishable products 57, which are thus easily and efficiently refrigerated by making snow chamber 22 of the proper size to displace a given number of packages of the perishable products to be shipped and by filling chamber 22 with carbon dioxide snow and placing it in the midst of the shipment of products shipped it will slowly and gradually refrigerate those products by absorption of latent heat and by the escaping gas which forces its way under the lid of chamber 22 and continuously keeps the air and moisture displaced. As explained in connection with Fig. 15, these chambers 20 and 22 may be formed of or insulated by balsa wood or similar material.

Figure 14:
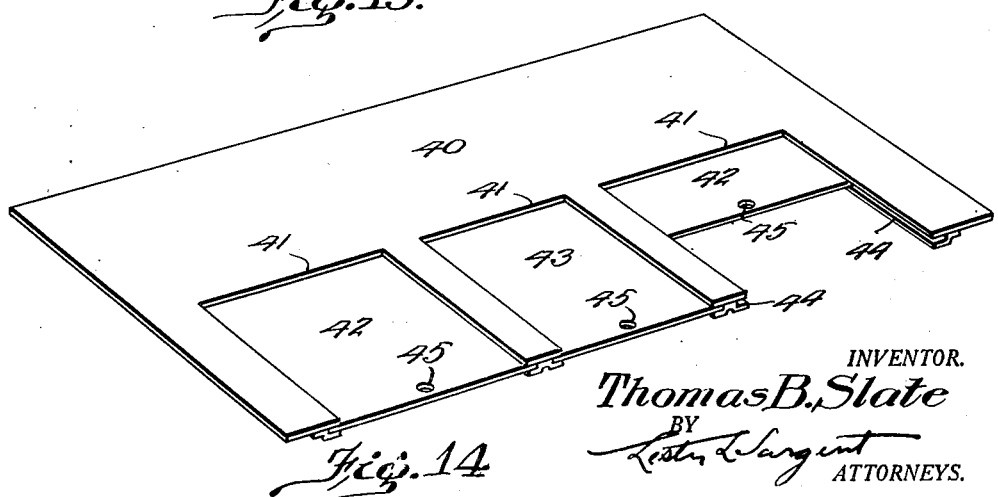
Fig. 14 is a perspective view of the shelf I have designed for such a home refrigerator.

Referring to Figs. 13 to 16, I provide a home refrigerator 35, having doors 36 provided only in the upper portion thereof, and having a convenient shelf 40, as shown in Fig. 14, for separating the upper from the lower part of the refrigerator 35. Members 42 and 43 are slide shelves mounted in the openings 41 and slidably supported on the guides 44, to make the lower compartment of the refrigerator readily accessible through the doors 36. Slide shelves 42 and 43 are provided with apertures 45 for operating the slides as well as for the escape of gas into the upper chamber of the refrigerator. The refrigerator, as shown in detail in Fig. 15, has conventional insulation 37 between the walls of 35; and is provided with suitable shelving 38, 39 and 40. At the bottom of the refrigerator is the cold storage compartment 46 for the storage and preservation of perishable products for indefinite periods. This is effected by making the lower half of the refrigerator airtight to the bottom of doorways 36. The escaping carbon dioxide being heavier than air excludes the air from this compartment and the escaping gas from the carbon dioxide snow being very cold first goes to the lowest part of the chamber 35 and as it becomes warmer it is raised to a higher position by the cold gas continually escaping from the snow. Compartment 47 is provided immediately above compartment 46 and is not quite so cold and not quite as free from atmospheric air, owing to the occasional opening of the refrigerator doors 36, but is sufficiently cool and sufficiently charged with carbon dioxide for shorter periods of cold storage. Compartments 48 and 49 are additional compartments still higher and not quite as cold as compartment 47 and containing more atmospheric air. These compartments are for daily use, and are especially valuable where such foods as butter are kept for daily use; thus the plate of butter 55 on the upper shelf is for daily use, and the package of butter 56 in the lower compartment is for indefinite storage. Other food supplies may be handled in the same manner according to the wishes of the user.

Member 51 represents a "thermos" bottle or like vacuum chamber for insulation purposes instead of insulation as represented by elements 20 and 22, which are wood insulation, such as balsa wood. The vacuum-walled chamber type of insulation illustrated in Fig. 15 may, if found desirable, be used as an equivalent to and in place of the balsa wood or similar insulation 22 shown in Figs. 11 and 12 and in previous figures of the drawings, even in railroad cars or large chambers of any dimensions for insulation of the carbon dioxide snow. Vacuum chamber 51 is provided with a suitable lid or cover 52, having a spaced wall 53 and a cover handle, and also having a passage 54 for the escape of gas through the lid or cover, instead of under its edges as described and illustrated in connection with other figures of the drawings. This escaping gas passage 54 may however be applied to any of the previously described boxes or containers of carbon dioxide snow, if preferred, and if desired the inner end of pipe 28 might be placed in communication with passage 54.

The snow deposited by the method shown in Figs. 1 to 6, is porous and light, but it may be then compressed by any suitable apparatus into bricks of any convenient size to fit the requirements of the trade. These bricks may be easily compressed to a considerably greater density than the liquid carbon dioxide, or even greater than water ice or water itself. The compressed brick of carbon dioxide snow also occupies smaller space and facilitates insulation very considerably by reason of its reduction in size; and not being porous it is required to evaporate wholly from its exterior surface, while the porous snow may evaporate through its pores, and offers a far greater surface for evaporation.

The carbon dioxide snow when compressed has the appearance of and a greater density than ice. Throughout the specification and claims the terms "carbon dioxide snow" or "snow" are to be construed as referring to the product whether in its porous or in its compressed form.

A form of snow making device is shown in Figs. 1 to 6 inclusive, this type being especially adapted to charging refrigerators of considerable capacity, the snow device being installed in the refrigerator as a part thereof. The snow device operates by connecting pipe 4 of Fig. 1 to a suitable source of supply of liquid carbon dioxide under pressure. The valve 5' in pipe 4 is opened, allowing the liquid carbon dioxide to flow through the abruptly restricted passage of the nozzle 24 and expand at 24' as shown in Fig. 6, whereby the liquid carbon dioxide flows under pressure until it passes the restricted passage of nozzle 24', said nozzle having an outwardly expanding mouth whereby to prevent clogging of the passage through the nozzle with frozen carbon dioxide. This sudden expansion of the liquid causes a part of it to turn to snow and the other part to gas. The force of the escaping snow and gas in one side of the snow dome or cylindrical chamber 25 causes a whirling effect of the snow and gas which acts to separate them, the centrifugal force and the weight of the snow causing it to travel to the outer portion of the cylinder and settle, and the same force causing the gas to move to the inside and upper position. This action will fill the chamber 22 with snow as shown at 26, without any snow escaping through discharge pipe 28 until the chamber 22 has completely filled. The portion of the liquid that turns to gas leaves the chamber 22 through pipe 28 at a very low temperature and is, as illustrated in Figs. 1 and 2, used to displace the remaining atmospheric air and moisture from the loaded car or chamber 20 after it has been completely loaded and closed up ready for refrigeration and transportation. The chamber 20 needs to be airtight or as nearly so as is practicable to make it, to the top of its side walls, as well as at the doorways, if they are provided in the side of the car as illustrated. This being done, the refrigerator car may be charged by merely connecting a source of supply of liquid carbon dioxide to the pipe 4 and opening the valve, permitting it to flow through nozzle 24, filling chamber 22 with snow, and discharging cold gas through the discharge pipe 28 to the point indicated by 29 in Fig. 1, this cold gas immediately settling to the bottom of the car and filling the car, displacing air to the top of the car or chamber 20, and cooling the contents of the car, refrigerating and preserving its contents for any predetermined length of time required for shipment.

When the container 22 has been filled with carbon dioxide snow the pipe 4 is disconnected and the valve 5' is closed. The walls of the chamber 20 and of chamber 22 both are insulated, the latter insulation being necessary to prevent the over-refrigeration of the contents of chamber 20 at points nearest to chamber 22, as well as to preserve the carbon dioxide snow for a considerable length of time by retarding its reversion to a gaseous state. It will be understood why this is necessary inasmuch as the temperature of the carbon dioxide snow is approximately between 108 and 112 degrees below zero Fahrenheit. The amount of insulation for chamber 22 is varied according to the amount of refrigeration required and this depends upon the nature of the perishable products to be refrigerated and upon the amount of heat which the chamber will absorb from the outside. As the temperature of the contents of chamber 20 rises the rapidity of evaporation of snow 26 in chamber 22 increases. The gas evaporating from the carbon dioxide snow leaves at a temperature of approximately 80 degrees below zero Fahrenheit, and as it passes out through pipe 28 along the upper part of chamber 20 to its other extreme end, it absorbs the heat, and then is discharged at 29 to settle to the bottom of the car as cold gas, displacing the warmer gas and any atmospheric air or moisture that might be left in chamber 20. It is well known that in snow making the amount of carbon dioxide released as gas is substantially greater than that retained as snow. Hence in charging chamber 22 the refrigerant effect produced by discharge of said gas into the refrigerator atmosphere will be greater than that producible by melting all of said snow, and it is obvious that such method will be particularly useful where small charges are admitted at short intervals; also where the cargoes are of frozen products which would not be harmed by the intense cold that would be produced by a long charging operation, such as would be necessary to produce a store of snow sufficient for a long trip.

This intense initial refrigeration is avoided by the method shown in Fig. 7, in which I employ already manufactured carbon dioxide snow by simply depositing it in a chamber 22 through covers 34 and 31, and using the escaping gas as it vaporizes from the snow to refrigerate chamber 20, as in the case of Figs. 1 and 2. The gas may be permitted to escape from under cover 31 or may be piped as in the case of the devices illustrated in Figs. 1 and 2, to any desired place in the refrigerator chamber 20. Such escaping gas functions in substantially the same manner as the gas escaping from the ice in the above described apparatus in Figs. 1 to 6, but as the intense prerefrigeration is lacking, a larger container and more snow or ice may be required for maintaining refrigeration under conditions which are otherwise similar. Any combination or rearrangement of the devices illutsrated may be alternatively used, such as using refrigerator chamber 8 (now shown in my divisional application Ser. No. 702,677) in place of chamber 22 in Figs. 1 and 2 by using a pipe 15 to discharge the pressure from chamber 8, in the same manner as pipe 28 is used in Figs. 1 and 2, and placing a suitable valve in pipe 15 similar to valve 5', through which to release the pressure, instead of pumping it by means of compressor 17.

Figure 12:
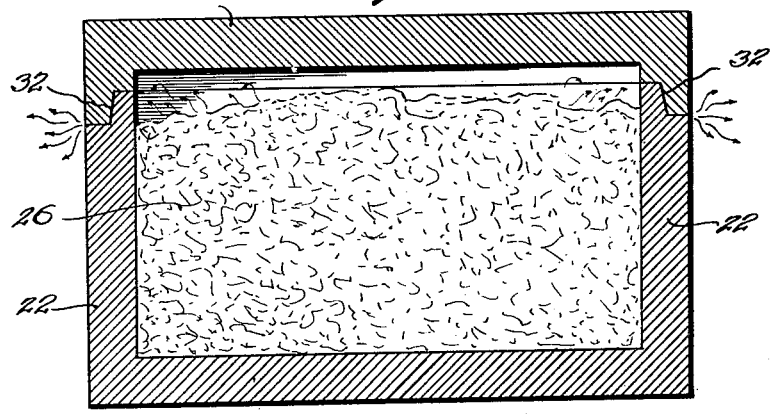
Fig. 12 is a vertical section through the dioxide snow chamber 22.
Figure 13:
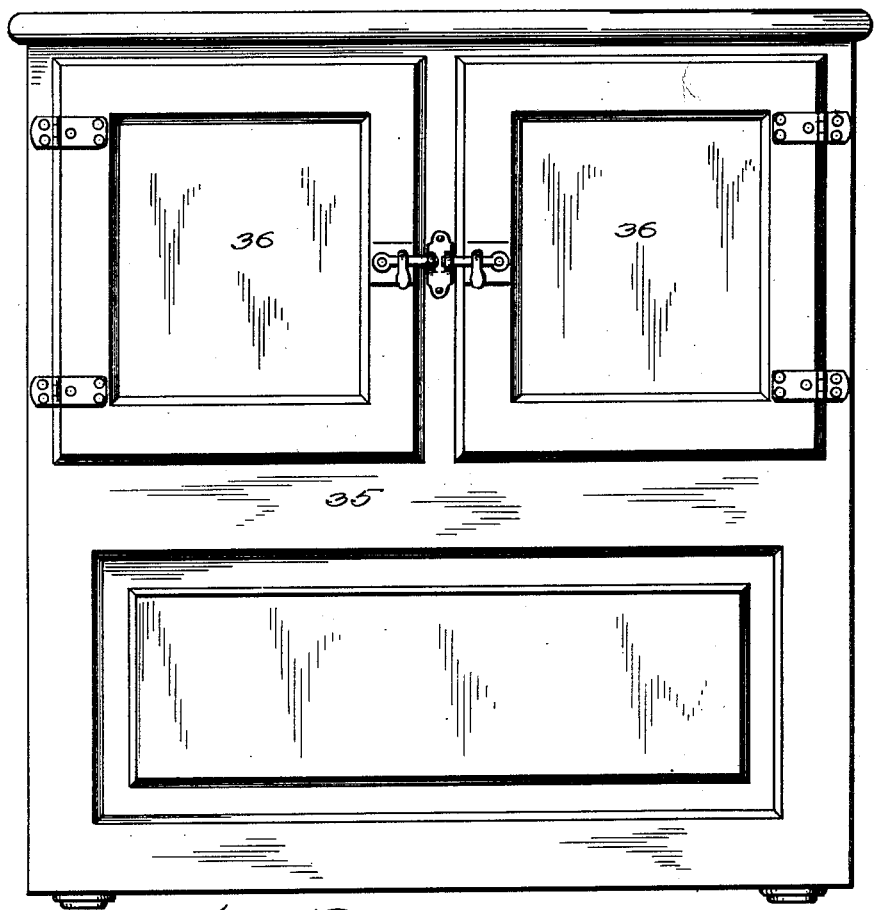
Fig. 13 is a front elevation of a home refrigerator especially designed and adapted for using carbon dioxide snow for refrigeration.

A simple method of charging small shipments of perishable products with carbon dioxide is shown in Figs. 11 and 12. Member 20 illustrates a wooden box or any well-insulated shipping container, made airtight to any point near the top of said box or container. The smaller box or chamber 22 is of similar or suitable structure of good insulating material and of a size to displace a given number of packages or parcels of the product 57 to be shipped and which must be preserved during shipment, the box or chamber 22 being filled with carbon dioxide snow and packed at or near the center of the shipment of articles to be preserved. There will be an automatic regulation of the temperature of the contents of chamber 20, for as the temperature rises the rapidity of escaping cold gas increases. The preserving qualities of carbon dioxide are likewise utilized, as the box will fill up with carbon dioxide, displacing any air and moisture that might be in the box 20.

Figure 15:
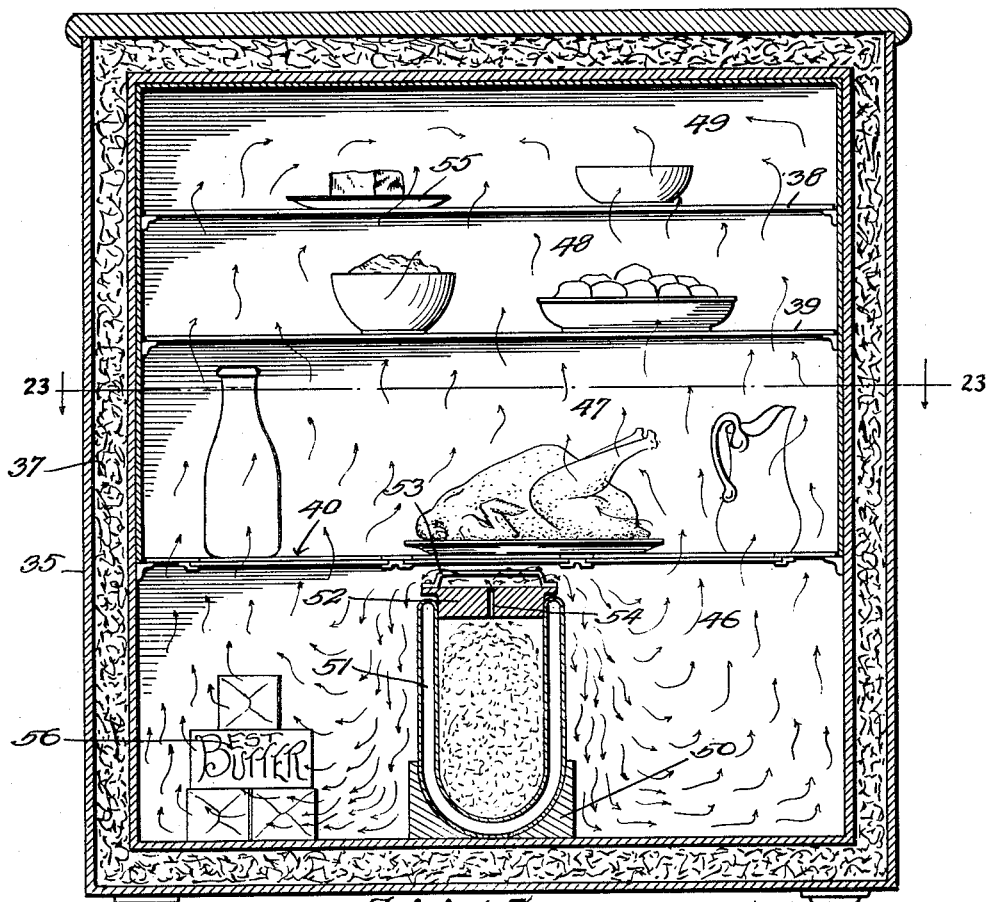
Fig. 15 is a vertical section through the refrigerator mentioned.
Figure 16:
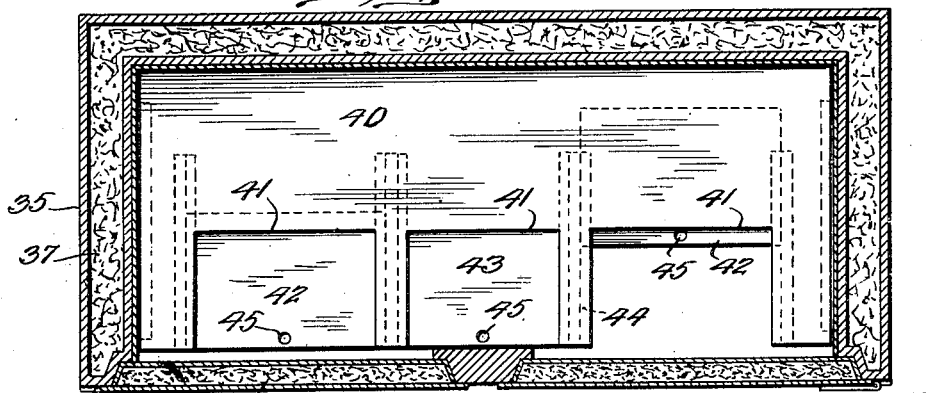
Fig. 16 is a horizontal section on line 23—23 of Fig. 15.

In my home refrigerator for using this form of refrigeration, shown in Figs. 15 and 16, box 35 is made airtight, at least downward from the doorways 36, which are necessarily in the upper part of the refrigerator only. In this type of refrigerator I utilize a "thermos" bottle type of container for the carbon dioxide snow; and may use this particular type of container if found preferable throughout all the various uses of the carbon dioxide snow as a refrigerant, to get a more complete insulation of the snow from the perishable products or supplies to be preserved, and also for the purpose of increasing the length of time a given amount of the snow will ordinarily supply cold carbon dioxide gas as a preservative and refrigerant to any refrigerating chamber. In chamber 51 I provide a lid or cover 52 with a passage 54 for the escape of gas, which form of cover may also be used throughout the other devices if desired, or connected with pipe 28, or in any similar manner. In this type of home refrigerator, which may also be used for hotels, restaurants, or other places where refrigerators are used for the preservation of food supplies, I provide varying temperatures in different parts of the refrigerator, as well as a variable density of carbon dioxide gas, by placing the refrigerant, carbon dioxide snow, at or near the bottom of the refrigerator, and as the cold gas escapes from this container 51 it immediately settles to the bottom of the refrigerating chamber 46 and drives any air there may be and the warmer gases upward, effecting a complete filling of the compartment with carbon dioxide gas. The lower compartment 46 is used as a cold storage compartment for the indefinite preservation of any perishable products. The compartment 47 immediately above is not quite so cold, and the higher compartment 48 is warmer. The doorways 36 opening into the upper compartments 48 and 49 admit a certain amount of atmospheric air, and these compartments will be used for preservation of products in daily use. An illustration is that of the dish of butter 55 on an upper shelf where it will not be too cold and become solid or frozen so as to prevent convenient spreading. The carbon dioxide snow is insulated as completely as is convenient from the warmer temperatures of the outside atmosphere and the very cold carbon dioxide gas produced by the evaporation of the snow is used for preserving products requiring the greatest amount of refrigeration.

It is quite commonly known that carbon dioxide has great preserving qualities, as it is one of the most inert gases known and being absolutely free of all bacteria and other elements causing deterioration of all perishable products, it causes them when completely immersed in the pure gas to maintain their present state of preservation for a very considerable length of time, and any product that has its pores completely filled with carbon dioxide gas will be preserved from decay practically regardless of temperature, so that a combination of slight refrigeration and complete exclusion of atmospheric air will preserve perishable products longer and more completely than any other type of refrigeration. Pure carbon dioxide gas has an affinity for moisture also that will prevent mold and other damaging effects caused by moisture. This fact is especially valuable in shipping grapes and other small fruits that mould very easily from the moisture of ordinary water-ice refrigeration.

Another important factor of this method of refrigeration is the possibility of keeping the refrigerant absolutely sanitary by turning it to ice directly from such a source of supply as manufacturing plants instead of storing it as a liquid in metal containers that corrode and rust quite badly, contaminating the liquid stored therein, as in the case of the conventional carbon dioxide metal tanks.

A further important value of carbon dioxide snow as a refrigerant for shipping as well as for home refrigeration is the fact that it supplies a great volume of the combination of refrigerant and preservative from a very few pounds of carbon dioxide snow. This is valuable in shipping because of the small space occupied by the refrigerant. It is especially valuable for home refrigeration because of the superior convenience and small cost of handling and delivery of the refrigerant, as a given weight of compressed carbon dioxide snow will produce much greater refrigeration than the same weight of water ice, and it is dry, and clean, and being so it may be conveniently handled. A refrigerator containing it may be placed anywhere in a kitchen or dining room to suit the wishes of the user, without any installation of plumbing being necessary to connect it to sewerage, as in the case of water-ice refrigerant, nor is there any need for drip pans of any kind, which pans are oftentimes neglected and allowed to run over when water ice is used.

The phrase "means permitting" or similar phrases referring specifically to the escape of carbon dioxide gas from evaporating carbon dioxide snow in a closed container shall be construed to apply to and define both a type of container having a small passage through its walls for the escape of the gaseous carbon dioxide or to the passage found or forced by the gas between the edges of a cover to the container and the wall of the opening in the container which the cover rests upon and closes sufficiently for insulation from the outside air.

While I have shown and described several specifically different methods and devices involving my present invention, it is to be noted that the most specific claims hereof are limited to the refrigerator shown in Figs. 13 to 16 inclusive; while progressively broader claims cover the device of Figs. 11 and 12, that of Figs. 7 to 10 and that of Figs. 1 to 6, and specific claims for the specific devices and methods not specifically claimed herein are reserved for other applications filed or about to be filed by me.

What I claim is:

1. The method of refrigeration which consists in placing in a chamber with the material to be refrigerated a suitably insulated solidified mass of an inert substance which at ordinary temperatures and pressures is a gas, and which on absorption of heat passes directly from the solid to the gaseous state, and permitting the gas as formed to permeate the chamber.

2. The method of refrigeration which consists in placing in a chamber with the material to be refrigerated a suitably insulated solidified mass of an inert substance which at ordinary temperatures and pressures is a gas heavier than air, and which on absorption of heat passes directly from the solid to the gaseous state, and permitting the gas as formed to permeate the chamber, displacing the air.

3. The method of refrigeration which consists in enclosing within a chamber with the material to be refrigerated, a quantity of suitably insulated carbon dioxide in solidified mass form, which on absorption of heat from the atmosphere within the chamber, passes directly from the solid to the gaseous state; and permitting all the gas thus formed to escape into and permeate the chamber.

4. The method of refrigeration which consists in enclosing within a chamber, with the material to be refrigerated, a quantity of suitably insulated carbon dioxide which has been previously frozen and is in solidified mass form, and which on absorption of heat through the insulation passes directly from a solid to a gas much heavier than air; and permitting all the gas to escape into said enclosing chamber, as formed, and to flow downward in said enclosing chamber, displacing the air upward.

5. In a refrigerating system, means containing carbon dioxide snow, said means including a sufficient extent of insulation to preserve the snow for the extended refrigeration desired and to prevent over-refrigeration of the products to be refrigerated, and means permitting escape of the gas from the melting carbon dioxide snow for use both as a refrigerant and as a preservative by utilizing the escaping gas to prevent deterioration of perishable products.

6. In a refrigerating system, including a suitable chamber enclosing means for containing frozen carbon dioxide, said containing means including an amount of insulation predetermined in accordance with the amount of refrigeration required so as to conserve the frozen carbon dioxide for the extended refrigeration desired and to prevent over-refrigeration of the product to be refrigerated, and means permitting escape of the gas from the melting carbon dioxide into said chamber for use both as a refrigerant and as a preservative by utilizing the escaping gas to prevent deterioration of perishable products.

7. In a refrigerating system the combination of a chamber to be refrigerated, a container of frozen carbon dioxide within the chamber, said container being formed of or including substantial insulating means, the capacity and insulation of the container being suitably proportioned to the total capacity and contents of the chamber to be refrigerated so as to effect the required amount of refrigeration by latent heat absorption and by the escaping carbon dioxide gas attendant upon and resulting from evaporation of the frozen carbon dioxide within the aforesaid container, under normal conditions.

8. A refrigerating system adapted to and using previously frozen carbon dioxide as the refrigerant, said system including a chamber to be refrigerated, and, wholly enclosed within and venting into said chamber, a substantially closed, insulated container holding the frozen carbon dioxide and adapted to produce a desired refrigeration by the absorption of latent heat and by the cold carbon dioxide gas resulting from the evaporation or melting of the frozen carbon dioxide, the specific gravity of the gas being utilized to exclude air and moisture from the products to be refrigerated.

9. In a refrigerating system, the combination of a chamber to be refrigerated, a container of carbon dioxide snow, said container being formed of or including substantial insulating means, the capacity of the container being suitably proportioned to the total capacity and contents of the chamber to be refrigerated to effect the required refrigeration by the escaping carbon dioxide gas produced by the evaporation of the carbon dioxide snow within the aforesaid container under normal conditions.

10. A refrigerating system adapted to and using carbon dioxide snow as the refrigerant, said system including a chamber to be refrigerated, a substantially closed insulated container holding carbon dioxide snow and adapted to produce the desired refrigeration by the cold carbon dioxide gas resulting from the evaporation or melting of the snow, the specific gravity of the gas being utilized to exclude air and moisture from the chamber or portion thereof in which are placed the products to be refrigerated.

11. A refrigeration apparatus adapted for and using carbon dioxide snow as the refrigerant, said apparatus comprising a refrigerating chamber, said chamber having doors only in its upper portion and having its lower portion airtight, shelves in said refrigerating chamber, the lowermost of said shelves having sliding doors whereby to afford access to the lower compartments of the chamber through the upper doors thereof, and a container of carbon dioxide snow positioned in or near the bottom of the refrigerating chamber, whereby the user is afforded compartments of different refrigerating temperatures and whereby the chambers most frequently in use are the more accessible, said regulation of the temperatures of the respective compartments being automatically controlled by the density of the escaping carbon dioxide gas from the container of carbon dioxide snow in the bottom compartment, substantially as set forth.

12. A refrigeration apparatus adapted for and using carbon dioxide snow as the refrigerant, said apparatus comprising an insulated refrigerating chamber, said chamber having its lower portion substantially airtight, doors only in the upper portion of the chamber, an insulated container of carbon dioxide snow positioned in or near the bottom of the refrigerating chamber, whereby the temperatures of different portions of the refrigerating chamber are automatically controlled by the density of the carbon dioxide gas escaping from the insulated container of carbon dioxide snow at the bottom of the refrigerating chamber.

THOMAS B. SLATE.